May 12, 1964 J. L. RENNICK 3,133,148

COLOR TELEVISION TRANSMITTER

Filed March 15, 1951 2 Sheets-Sheet 1

INVENTOR.
JOHN L. RENNICK
BY Bruce L. Birchard
AGENT

May 12, 1964 J. L. RENNICK 3,133,148

COLOR TELEVISION TRANSMITTER

Filed March 15, 1951

2 Sheets-Sheet 2

INVENTOR.
JOHN L. RENNICK

BY Bruce L. Birchard

AGENT

United States Patent Office 3,133,148
Patented May 12, 1964

3,133,148

COLOR TELEVISION TRANSMITTER

John L. Rennick, Elmwood Park, Ill., assignor to Zenith Radio Corporation, a corporation of Delaware Filed Mar. 15, 1951, Ser. No. 215,761
6 Claims. (Cl. 178—5.4)

The present invention relates to television apparatus and more particularly to a simplified system and apparatus for color television.

One of the major problems which has impeded the advance of color television has been that of realizing color fidelity in the overall transmitting and receiving apparatus while limiting the frequency spectrum utilized for the transmission of such information to channels no wider than those used presently for conventional monochromatic transmission. Among the proposed methods for realizing high fidelity despite limited band width are the mixed high system disclosed in "Electronics Magazine" for December 1950, at page 122; the dot-interlace system described in the "RCA Review" for June, 1950, at pages 255 to 286; and the frequency interlace system described in the December, 1950 issue of "Electronics Magazine" at page 70.

While these prior approaches to the problem of color television may be satisfactory, at least from a theoretical view point, they are relatively complex and impose undue complications in the system circuitry, especially at the receiver.

It has been suggested in the literature and confirmed by experiment that the human eye is much less critical of lack of color detail than it is of lack of black-white or brightness detail. It is essential, therefore, that the brightness information of a televised scene be transmitted with utmost fidelity. This requirement is not easily satisfied in certain prior color television systems which, consequently, are subject to some inherent disadvantages.

Consider, for example, the well-known simultaneous method of color telecasting wherein three signals are transmitted concurrently, each representing an assigned one of the primary-color fields of the image and being video modulated in accordance with the entire brightness and saturation information of its particular field. If any of these signals becomes delayed in phase or unduly reduced in amplitude relative to the others, as may be occasioned by differences in the propagation characteristics of the several signal channels, a material loss in detail may be experienced in the reproduced image. This loss results from a loss in black-white or brightness detail rather than any deficiency in color hue and saturation information, as distinguished from brightness information. Difficulties of this type may be expected in any such system employing a plurality of color-component signals video modulated with the full range of brightness information and effectively transmitted at different frequencies. It is desirable to prevent such loss of detail while retaining fidelity and relatively simple circuitry.

Furthermore, most prior art systems have considered essential the transmission of three color signals in any three color television system. It is clear that a reduction in the number of color signals transmitted results in apparatus and spectrum economies.

Accordingly, it is an object of this invention to provide a simplified color television system which has high fidelity performance while requiring only the conventional channel widths to realize such fidelity.

It is a further object of this invention to provide an improved color television system in which the picture detail is of the highest possible order for a given available transmission band width.

It is a still further object of this invention to provide apparatus which will establish and maintain proper phase and amplitude relationships between the signals representing the colors in a transmitted image.

It is an additional object of this invention to provide apparatus for transmitting and reproducing a scanned image in natural color with a reduction in the number of signals required to transmit the color information.

In accordance with one feature of the present invention, a color television transmitting apparatus includes means for generating three primary color signals corresponding to a scanned image together with means for additively combining the three primary color signals to form a brightness signal. The brightness signal and the primary color signals are in turn additively combined in predetermined polarity to form at least two color-control signals. The apparatus further includes means for transmitting the color-control signals and the brightness signal.

For a better understanding of the invention together with other and further objects thereof, reference is made to the following description taken in connection with the accompanying drawings in which.

Figure 1:
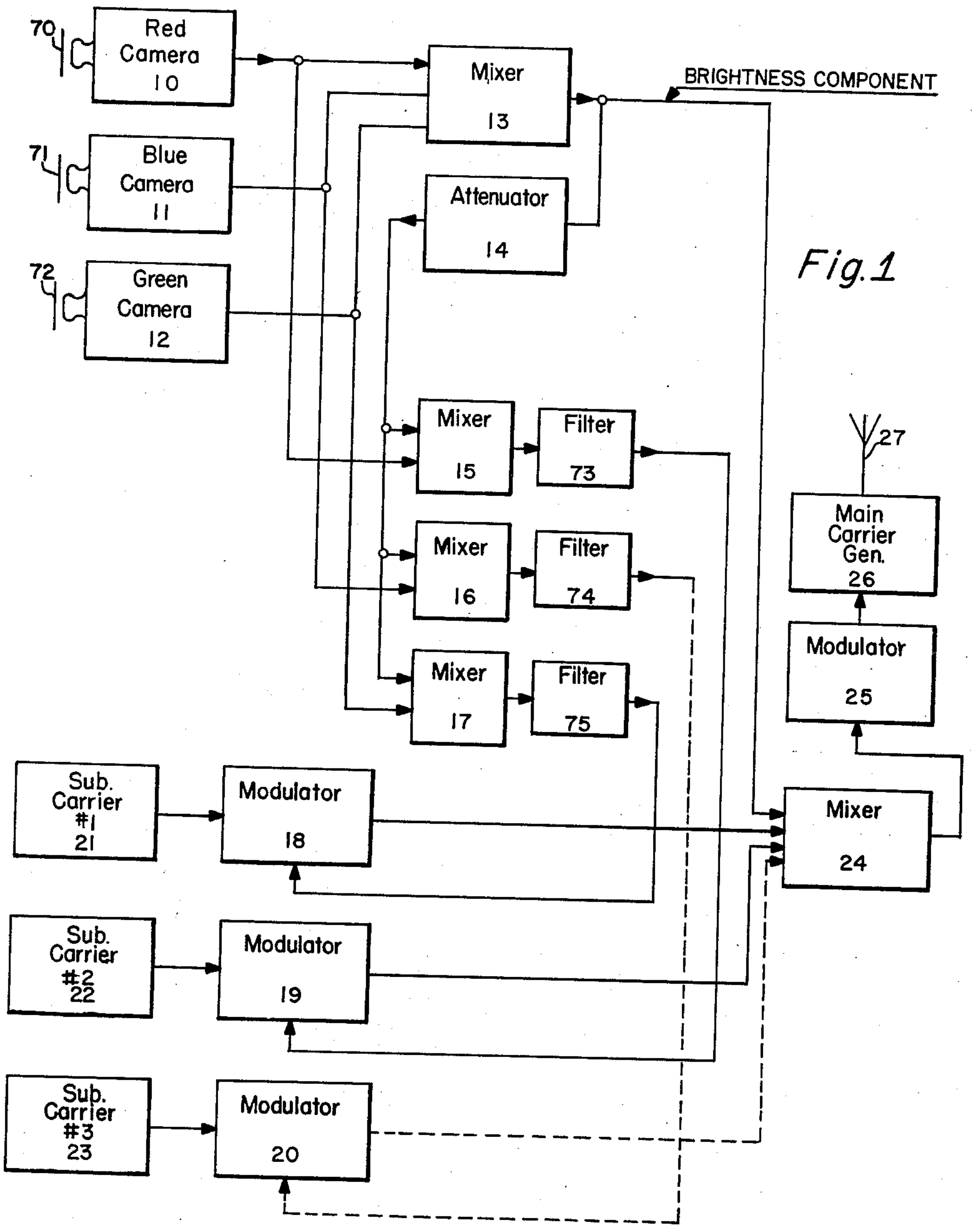
FIGURE 1 is a block diagram of a color-television transmitter according to the present invention.

In FIGURE 1, video-frequency signal components are generated by three pick-up camera devices 10, 11 and 12 operating simultaneously but individually developing video information corresponding to an assigned color field of the image being televised. To that end, filters 70, 71 and 72 may be interposed between the cameras and their common object so that the devices 10, 11 and 12 are influenced, respectively, by the red, blue and green color fields of the object. The line and field scanning functions of the cameras are carried on in synchronism and in phase, in the manner of conventional simultaneous color transmission and under the control of a common scanning-signal generating system or individual scanning generators and a common master timer, all of which have been omitted from the drawing since they are well-known and, per se, constitute no part of the instant invention. For an example of suitable pick-up equipment, see the article "Pick-Up Equipment" by Sziklai et al., Proceedings of the IRE, September 1947, pages 862–871.

The video signals from the red, blue and green color cameras 10, 11 and 12, respectively, are fed to a common mixer 13 which produces in its output circuit a brightness or monochrome signal. This mixer circuit may be a conventional one, consisting of three triode vacuum tubes with their anode elements connected in parallel and coupled to a common impedance and with their grid elements respectively connected to the output circuits of the red, blue and green cameras. The cathode circuits of these triodes may contain unbypassed resistors of large values so that substantially unity gain is obtained in each of the tubes. For a discussion of multiple-signal mixers of this type, see "Vacuum Tube Amplifiers" by Valley and Wallman, McGraw-Hill, 1948, pages 99–101. The output signal from mixer 13 has an amplitude which is a summation of the individual amplitudes of the signals from cameras 10, 11 and 12 but is of inverted phase. This output signal is attenuated in attenuator 14 to one-third its value and fed through three branches to the input circuits of three mixers 15, 16 and 17 where it is added to the red, blue and green camera signals, respectively. The output signals from mixers 15, 16 and 17 constitute the red control signal, the blue control signal and the green control signal, respectively.

These color-control signals represent the hue and saturation of the scanned image, but not its brightness. Since the color-control signals are individually proportional to the amplitude difference between respective ones of the primary color signals and a portion of the brightness signal, they may appropriately be termed "color-difference" signals.

The output signals from these mixers 15, 16 and 17 may be applied to conventional amplitude modulators 18, 19 and 20 with which there are associated subcarrier generators 21, 22 and 23, respectively. Typical oscillators suitable for use as subcarrier generators are illustrated in "Radio Engineers' Handbook" by Terman, McGraw-Hill, 1943, page 496; suitable modulator circuits are shown at pages 551 and 553 of the handbook. The frequencies of operation of the subcarrier generators are different from one another and each is an odd multiple of one-half the line scanning frequency of the television system. The full brightness signal from mixer 13 is supplied to mixer 24 which also receives the modulated subcarrier signals from generators 21, 22 and 23. Once again, mixer 24 is a simple adder circuit and its output drives a further modulator 25 which amplitude modulates the main carrier signal supplied by a generator 26. This main carrier generator, which may also be termed the transmitter, may be coupled to an appropriate antenna or other wave disseminating apparatus 27. In this system, the brightness or luminance signal constitutes the direct intelligence modulation on the transmitted carrier and the color-control signals appear as modulated sub-carriers on the main signal.

Of course, it is preferable to include the usual blanking, equalizing and synchronizing components, both line and field, in the transmitted signal and that may be accomplished by supplying such additional components to mixer 24 along with the brightness components from mixer 13. Any well-known generating unit may be included in the transmitter as a source of such additional components but since that generator is no part of the present invention, it has not be illustrated. Likewise, any known technique may be employed for transmitting the sound information accompanying the video program.

The choice of the sub-carrier frequencies is important for, by appropriate selection of these frequencies, the color-control signals may be sandwiched within or effectively interlaced with signal component groupings of the brightness signal. As has been known for many years, the spectrum of a pulse modulated carrier wave contains regions of high energy and regions of very low energy with the latter occurring at odd multiples of one-half the pulse repetition rate.

As applied to television transmission, this principle means that the video content is bunched in frequency groups spaced by the line-scanning frequency and having relative signal voids therebetween. It is evident that the sub-carrier frequencies may be chosen to cause the color-control signals to fall within such voids so that the bandwidth of the transmission does not exceed the 4 megacycle width established as the effective band for commercial television broadcasts.

The use of this type of "frequency interlace" for the color signals themselves as distinguished from the color-control signals of the present invention, is described by R. B. Dome in his article in the September 1950, issue of "Electronics Magazine."

It is not necessary to transmit all three color-control signals in a three-color television system. It is sufficient to transmit two color-control signals and the brightness or monochrome signal. The color-control signals derived at the output circuits of mixers 15, 16 and 17, respectively, are free from brightness information, a fact that may be shown mathematically, as follows:

Let:

Red camera signal $=R$
Green camera signal $=G$
Blue camera signal $=B$
Brightness $=W$ Red color-control signal $=R'$
Green color-control signal $=G'$
Blue color-control signal $=B'$ $$W=R+B+G \quad (1)$$
$$R'=R-\tfrac{1}{3}W \quad (2)$$
$$G'=G-\tfrac{1}{3}W \quad (3)$$
$$B'=B-\tfrac{1}{3}W \quad (4)$$

$$R'+G'+B'=R+G+B-\frac{3W}{3}=0 \quad (5)$$

Hence, there is no brightness or monochrome information in the derived color-control signals, and furthermore, it is evident that these signals are not independent variables for, $$B'=-(R'+G') \quad (6)$$

Thus, in the transmitter of FIGURE 1, sub-carrier generator 23, its associated modulator 20 and its connection to mixer 24 may be eliminated and the blue color-control signal with which it was modulated may be synthesized at the receiver. The other two sub-carriers supplied by generators 21 and 22 may, in the standard 4 megacycle system, be located at 3.583 megacycles and 3.898 megacycles. The bandwidth allotted to each color-control signal may be very small compared with that of the brightness or monochrome signal and may, for example, be limited to two-tenths megacycles in the low frequency end of the video sepctrum by filters 73, 74 and 75 because the detail of the reproduced image is not dependent upon the detail of the control signal but, rather, is determined by the detail of the monochrome signal. Suitable low-pass filters may be selected from the circuits illustrated at page 228 of the "Radio Engineers Handbook" noted above.

Figures 2, 3:
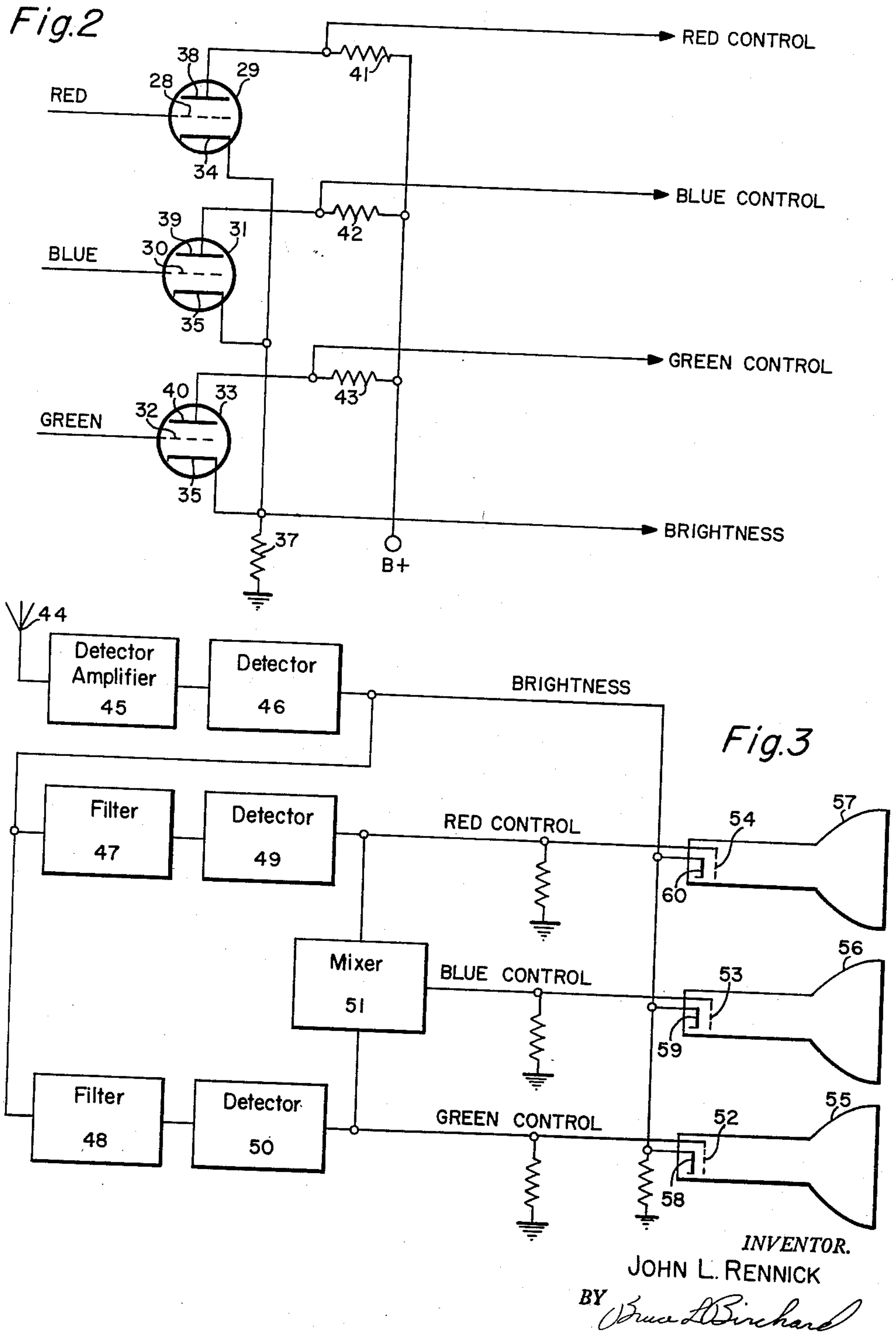
FIGURE 2 is a circuit diagram of a color-control signal generator for use at the transmitter.
FIGURE 3 is a block diagram of a color-television receiver useful with the present invention.

In FIGURE 2 a circuit is shown which may replace mixers 13, 15, 16 and 17 and attenuator 14 of FIGURE 1. Its operation is as follows:

Video signals from the red camera are applied to grid 28 of a first vacuum tube 29. The video signals from the blue camera are applied to grid 30 of another vacuum tube 31 and video signals from the green camera are applied to grid 32 of still another vacuum tube 33. Cathodes 34, 35 and 36 of vacuum tubes 29, 31 and 33, respectively, are connected to a common cathode load resistor 37 which, in turn, is connected to a ground potential point. The magnitude of resistor 37 is large with respect to the inverse of the transconductance of vacuum tubes 29, 31 and 33, which have substantially identical characteristics. The anodes 38, 39 and 40 are connected through their respective load resistors 41, 42 and 43 to a common source of unidirectional potential indicated as B+. A red control signal, having a value equal to the red camera signal minus one-third the brightness signal, is automatically obtained at anode 38 of vacuum tube 29. Correspondingly, blue and green color-control signals may be obtained from anodes 39 and 40 of vacuum tubes 31 and 33, respectively. The brightness or monochrome signal, which is the sum of the camera signals, is obtained from the common connection of cathodes 34, 35 and 36. That the control signals are, in fact, the respective camera signals minus one-third of the brightness signal and, thus are free of brightness information may best be shown by the following mathematical analysis:

Let:

$r_k$ = value of resistor 37
$M$ = mutual conductance of tubes 29, 31 and 33
$K$ = voltage across resistor 37
$i_R$, $i_B$, $i_G$ = space current in vacuum tubes 29, 31 and 33, respectively.
$r_p$ = value of plate resistors 41, 42 and 43
$E_R$, $E_B$, $E_G$ = grid-cathode voltage in vacuum tubes 29, 31 and 33, respectively.

Then, referring to Equations 1–6 appearing earlier herein:

$$i_R = ME_R \quad (7)$$
$$i_G = ME_G \quad (8)$$
$$i_B = ME_B \quad (9)$$
$$K = M(E_R + E_G + E_B)r_k \quad (10)$$
$$E_R = R - K \quad (11)$$
$$E_G = G - K \quad (12)$$
$$E_B = B - K \quad (13)$$
$$K = M[(R-K)+(G-K)+(B-K)]r_k \quad (14)$$
$$K = Mr_k(R+G+B) - 3Mr_kK \quad (15)$$
$$K = Mr_kW - 3Mr_kK \quad (16)$$
$$K(1+3Mr_k) = Mr_kW \quad (17)$$
$$K = \frac{W}{\frac{1}{Mr_k}+3} \quad (18)$$

If $$r_k >> \frac{1}{M},\ Mr_k >> 1 \quad (19)$$

and $$K = \frac{W}{3} = \tfrac{1}{3}\text{ Brightness} \quad (20)$$

Further:

$$i_R = ME_R \quad (21)$$
$$i_R = M(R-K) = M\left(R - \frac{W}{3}\right) = MR' \quad (22)$$

Load voltage across $r_p 41 = i_R r_p = Mr_p R' =$ constant (red control signal) (23)

It can be shown that the blue and green control signals are similarly derived automatically from the circuit. By adding all the control signals together, it will be found that their sum is a constant times zero which is the necessary condition for color-control signals free of monochrome information. Furthermore, and as in the arrangement of FIGURE 1, the color-control signals generated automatically with this circuit are related so that only two need be transmitted along with the brightness or monochrome signal, these two being employed to synthesize the third color-control signal at the receiver.

In FIGURE 3, the signal disseminated by the transmitter of FIGURE 1 is picked up on antenna 44 and is appropriately heterodyned and amplified at intermediate frequency in a detector-amplifier 45 and is then passed to a video detector 46 in the output circuit of which the brightness information components are obtained directly. By means of appropriate band-pass filters 47 and 48 coupled to signal detector 46, the sub-carrier signals modulated with the color-control information are selected and supplied to respective detectors 49 and 50 wherein a pair of color-control signals is obtained. If three color-control signals are transmitted, although that is unnecessary, a third tuned filter and detector may be provided to demodulate its carrier and obtain the third color-control signal. The circuitry for filters 47 and 48 may, for example, be selected from the many different arrangements shown at pages 230–231 of Terman's "Radio Engineers' Handbook," and detectors 49 and 50 may be constructed in the manner illustrated at pages 554 and 572 of the same reference.

For the case under consideration in which only two color-control signals are transmitted, it will be assumed that the output signal from detector 49 is the red color-control signal R′ and the output from detector 50 is the green color-control signal G′. The blue color-control signal B′ may be obtained from a mixer 51 having an input circuit connected to both detectors 49 and 50 for, as has already been indicated in Equation 6, this control signal is related to and obtainable from the other two. This mixer may comprise a pair of triode vacuum tubes having their anodes connected to a common load resistor and their grids connected, respectively, to the output circuits of detectors 49 and 50. The negative sign of Equation 6 is automatically effected by the inversion inherent in the mixer stage. These red, blue and green color-control signals, which represent the hue and saturation of the colors in the scanned image, may then be applied to the control grids 52, 53 and 54, respectively, of the electron guns in cathode-ray tubes 55, 56 and 57. Cathodes 58, 59 and 60 of the three cathode-ray tubes are connected together and to the output of detector 46 and are connected to ground through a common cathode impedance.

As a result, the brightness signal is applied to the three cathodes in parallel, whereas the color-control signals are supplied individually one to each control grid of the three cathode-ray tubes. Alternatively, the brightness signal may be applied to the three grids in parallel and the control signals may be applied to respective cathodes, but due regard must be given to polarity. In either case, additive modulation of the beam from each gun is effected. Appropriate scanning, focusing and accelerating potentials are applied to the cathode-ray tubes for operation thereof.

The appropriate primary color filter may be provided for each cathode-ray tube, and the image on each tube may be superimposed on that from each other tube through an appropriate optical system in well known fashion.

A single three-gun cathode-ray tube of the type described at page 34 of the "Tele-Tech Magazine" for July 1950 may replace the three separate single gun tubes, in which case the color filters and optical system are not required.

The receiver of FIGURE 3 may be provided with conventional synchronization signal separators, sweep circuits, sound detector and reproducing apparatus, and power supplies, all of which are well known in the art and do not form a part of this invention, and hence are not shown.

It is apparent from the foregoing description that a system and apparatus have been provided which are greatly simplified over existing color-television systems and apparatus. Furthermore, this apparatus makes certain the transmission of the brightness or monochrome information, which is essential to good detail in the reproduced picture, with optimum efficiency and eliminates all such brightness information from the color control signals which may be transmitted on different nominal frequencies. These color-control signals, being free of brightness information, represent color hue and saturation only. In addition, apparatus has been provided at the transmitter which simply and automatically generates such control signals and brightness signals that only two color-control signals and the brightness signal need be transmitted, the third color-control signal being synthesized in a simple fashion at the receiver.

Although the concept of separating a brightness signal from color-control signals has been shown herein in connection with a frequency interlace type of color system it is equally adaptable to a straight simultaneous color system or to a dot-interlace color system. In the latter case the color-control signals are sampled and placed on the carrier which has been modulated with the brightness information. Appropriate desampling apparatus is then provided at the receiver so that the color-control signals which are transmitted are reconstituted and if only two such signals are transmitted they may be used to synthesize the remaining color-control signal. Certain features of the apparatus disclosed herein are described in the co-pending continuation-in-part application Serial No. 232,559, filed June 20, 1951, for Color Television System, by John L. Rennick, and assigned to the same assignee as the present application.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. The method of transmitting three-color television signals comprising the following steps: generating three primary color signals corresponding to a scanned image; additively combining said three primary color signals to form a brightness signal; additively combining said brightness signal and said primary color signals in predetermined polarity to form at least two color-control signals; and transmitting said two color-control signals and said brightness signal.

2. The method of transmitting three-color television signals comprising the following steps: generating three primary color signals corresponding to a scanned image; additively combining said three primary color signals to form a brightness signal; additively combining said brightness signal and said primary color signals in predetermined polarity and in predetermined amplitude ratio to form at least two color-control signals; and transmitting said two color-control signals and said brightness signal.

3. Apparatus for transmitting a composite color television signal representative of an image comprising first, second and third primary color components, said apparatus comprising: means for developing a first primary color signal representative of the image component of said first primary color; means for developing a second primary color signal representative of the image component of said second primary color; means for developing a luminance signal representative of the brightness component of said image; means coupled to said luminance-signal-developing means and to said first primary-color-signal developing means for directly subtracting said luminance signal and said first primary color signal, one from the other, to develop a first color-difference signal; means coupled to said second primary-color-signal developing means and to at least one of said other means for generating a second color-difference signal; and means coupled to said luminance-signal-developing means, to said subtracting means, and to said second color-difference-signal generating means for simultaneously transmitting said luminance signal and said first and second color-difference signals over a common channel.

4. Apparatus for transmitting a composite color television signal representative of an image comprising first, second and third primary color components, said apparatus comprising: means for developing a first primary color signal representative of the image component of said first primary color; means for developing a second primary color signal representative of the image component of said second primary color; means for developing a third primary color signal representative of the image component of said third primary color; means including a mixer coupled to each of said primary-color-signal developing means for additively combining said first, second and third primary color signals in predetermined amplitude ratios to provide a luminance signal representative of the brightness component of said image; means coupled to said mixer and to said first primary-color-signal developing means for directly subtracting said luminance signal and said first primary color signal, one from the other, to develop a first color-difference signal; means coupled to said second primary-color-signal developing means and to at least one of said other means for generating a second color-difference signal; and means coupled to said mixer, to said subtracting means, and to said second color-difference-signal generating means for simultaneously transmitting said luminance signal and said first and second color-difference signals over a common channel.

5. Apparatus for transmitting a composite color television signal representative of an image comprising first, second and third primary color components, said apparatus comprising: means for developing a first primary color signal representative of the image component of said first primary color; means for developing a second primary color signal representative of the image component of said second primary color; means for developing a third primary color signal representative of the image component of said third primary color; means including a mixer coupled to each of said primary-color-signal developing means for additively combining said first, second and third primary color signals in predetermined amplitude ratios to provide a luminance signal representative of the brightness component of said image; means coupled to said mixer and to said first primary-color-signal developing means for directly subtracting said luminance signal and said first primary color signal, one from the other, to develop a first color-difference signal; means coupled to said second primary-color-signal developing means and to said mixer for directly subtracting said luminance signal and said second primary color signal, one from the other, to develop a second color-difference signal; and means coupled to said mixer and to said first and second color-difference-signal developing means for simultaneously transmitting said luminance signal and said first and second color-difference signals over a common channel.

6. The method of transmitting color television signals comprising: generating three primary color video signals corresponding to a scanned image; additively combining said three primary color video signals to form a brightness video signal; additively combining said brightness video signal and said primary color video signals in predetermined polarity to form at least two color-control video signals; generating a carrier signal; and modulating said carrier signal with said brightness video signal and said color-control video signals.

References Cited in the file of this patent

UNITED STATES PATENTS

| | | |
|---|---|---|
| 2,335,180 | Goldsmith | Nov. 23, 1943 |
| 2,512,152 | Haworth et al. | June 20, 1950 |
| 2,535,061 | Grieg | Dec. 26, 1950 |
| 2,535,552 | Schroeder | Dec. 26, 1950 |
| 2,545,957 | Kell | Mar. 20, 1951 |
| 2,554,693 | Bedford | May 29, 1951 |
| 2,558,351 | Fredendall | June 26, 1951 |
| 2,566,713 | Zworykin | Sept. 4, 1951 |
| 2,635,140 | Dome | Apr. 14, 1953 |
| 2,657,253 | Bedford | Oct. 27, 1953 |
| 2,728,813 | Loughlin | Dec. 27, 1955 |
| 2,773,929 | Loughlin | Dec. 11, 1956 |
| 2,774,072 | Loughlin | Dec. 11, 1956 |